United States Patent
Shum et al.

(10) Patent No.: US 12,429,242 B2
(45) Date of Patent: Sep. 30, 2025

(54) THERMOSTAT WITH DETACHABLE DIAL CONTROL

(71) Applicant: Computime Electronics (Shenzhen) Co. Ltd., Longgang District (CN)

(72) Inventors: Wai Yin Shum, Hong Kong (CN); Kam Yuen Lam, Hong Kong (CN); Ching Bo Lam, Hong Kong (CN)

(73) Assignee: Computime Electronics (Shenzhen) Co. Ltd., Shenzhen (CN)

( * ) Notice: Subject to any disclaimer, the term of this patent is extended or adjusted under 35 U.S.C. 154(b) by 202 days.

(21) Appl. No.: 18/148,069

(22) Filed: Dec. 29, 2022

(65) Prior Publication Data

US 2023/0228441 A1 Jul. 20, 2023

Related U.S. Application Data

(60) Provisional application No. 63/300,323, filed on Jan. 18, 2022.

(51) Int. Cl.
*F24F 11/56* (2018.01)
*H02J 50/10* (2016.01)

(52) U.S. Cl.
CPC .............. *F24F 11/56* (2018.01); *H02J 50/10* (2016.02)

(58) Field of Classification Search
CPC .. F24F 11/00; F24F 11/50; F24F 11/52; F24F 11/523; F24F 11/556; F24F 11/56; H02J 50/10
See application file for complete search history.

(56) References Cited

U.S. PATENT DOCUMENTS 6,975,958 B2 12/2005 Bohrer et al.
7,142,948 B2 11/2006 Metz
(Continued)

FOREIGN PATENT DOCUMENTS

DE 102015224462 A1 5/2017
EP 1264752 A2 12/2002
(Continued)

OTHER PUBLICATIONS

May 10, 2024—(EP) Examination Report—App 23151297.1.
May 2, 2023—(EP) Extended Search Report Appn 23151297.1.

*Primary Examiner* — Jonathan Bradford
(74) *Attorney, Agent, or Firm* — Banner & Witcoff, Ltd.

(57) ABSTRACT

A thermostat includes a detachable dial control unit that may be positioned with an anchoring component. The anchoring component may assume different forms including a wall plate, a wireless recharging dock, or a headless control unit/wall mounted unit that serve different needs of a user. The detachable dial control unit may be removed while still allowing the user to change thermostatic settings of a heating, ventilation, and air conditioning (HVAC) system by rotating an outer ring indicative of thermostatic information and sending the information to a headless control unit/wall mounted unit via a wireless communication channel. To facilitate alignment of the detachable dial control unit with the anchoring component, each may include a plurality of alignment magnets having a magnetic polarity pattern. Also, a wireless charging dock and headless control unit/wall mounted unit may recharge the detachable dial control unit via an activated electromagnetic induction path.

23 Claims, 11 Drawing Sheets

(56) References Cited

U.S. PATENT DOCUMENTS

| | | |
|---|---|---|
| 7,159,789 B2 | 1/2007 | Schwendinger et al. |
| 7,159,790 B2 | 1/2007 | Schwendinger et al. |
| 7,476,988 B2 | 1/2009 | Mulhouse et al. |
| 7,584,899 B2 | 9/2009 | de Pauw et al. |
| 7,634,504 B2 | 12/2009 | Amundson |
| 8,195,313 B1 | 6/2012 | Fadell et al. |
| 8,280,536 B1 | 10/2012 | Fadell et al. |
| 8,385,822 B2 * | 2/2013 | Chatterjee ............... H04M 1/04 455/41.1 |
| 8,927,137 B2 | 1/2015 | Ayub et al. |
| 9,160,022 B2 | 10/2015 | Pruett et al. |
| 9,268,344 B2 * | 2/2016 | Warren ................. G06F 1/3212 |
| 9,343,716 B2 | 5/2016 | Rothkopf et al. |
| 9,442,522 B2 | 9/2016 | Tussy |
| 9,564,761 B2 | 2/2017 | Hopfer, III et al. |
| 10,020,476 B2 | 7/2018 | Fan |
| 10,020,668 B2 | 7/2018 | Adamisin |
| 10,209,688 B2 | 2/2019 | Stefanski et al. |
| 10,256,511 B2 | 4/2019 | Clemente et al. |
| 10,389,149 B2 | 8/2019 | Slupik et al. |
| 10,425,241 B2 | 9/2019 | Kim et al. |
| 10,468,642 B2 | 11/2019 | Tamburrino |
| 10,476,291 B2 | 11/2019 | Rho et al. |
| 10,564,433 B2 | 2/2020 | Lee et al. |
| 10,627,791 B2 | 4/2020 | Fadell et al. |
| 10,960,847 B2 | 3/2021 | Chung et al. |
| 11,070,098 B2 | 7/2021 | Ding et al. |
| 2012/0131504 A1 | 5/2012 | Fadell et al. |
| 2014/0203091 A1 | 7/2014 | Nair |
| 2016/0054026 A1 | 2/2016 | Warren et al. |
| 2016/0116183 A1 * | 4/2016 | Lazar ................. G05D 23/1905 236/1 C |
| 2017/0346318 A1 | 11/2017 | Slupik et al. |
| 2018/0053953 A1 | 2/2018 | Eickhoff et al. |
| 2018/0062219 A1 | 3/2018 | Miles et al. |
| 2018/0226750 A1 * | 8/2018 | Widegren .......... H01R 13/5219 |
| 2019/0277531 A1 * | 9/2019 | Gillette .................... F24F 11/56 |
| 2020/0083560 A1 | 3/2020 | Harutyunyan et al. |
| 2020/0174587 A1 | 6/2020 | Park |
| 2020/0227954 A1 | 7/2020 | Ding et al. |
| 2021/0164680 A1 | 6/2021 | Gillette et al. |
| 2021/0172635 A1 * | 6/2021 | Schultz ................... F24F 11/58 |

FOREIGN PATENT DOCUMENTS

| | | |
|---|---|---|
| EP | 2177388 A2 | 4/2010 |
| EP | 2308388 A1 | 4/2011 |
| EP | 2991370 A1 | 3/2016 |
| EP | 3002933 A1 | 4/2016 |
| EP | 3116093 A1 | 1/2017 |
| EP | 3153057 A1 | 4/2017 |
| EP | 3341658 A1 | 7/2018 |
| EP | 3383010 A1 | 10/2018 |
| EP | 3465711 A1 | 4/2019 |
| EP | 3507851 A1 | 7/2019 |
| WO | 2020051432 A1 | 3/2020 |
| WO | 2020142757 A1 | 7/2020 |
| WO | 21248002 A1 | 12/2021 |
| WO | 22046295 A1 | 3/2022 |

* cited by examiner

THERMOSTAT WITH DETACHABLE DIAL CONTROL

This patent application claims priority to U.S. Provisional Patent Application No. 63/300,323 entitled "Thermostat with Detachable Dial Control" filed on Jan. 18, 2022, which is hereby incorporated by reference in its entirety.

TECHNICAL FIELD

Aspects of the disclosure relate to a thermostat for controlling a heating, ventilation, and air conditioning (HVAC) system.

BACKGROUND OF THE INVENTION

In order to control a heating, ventilation, and air conditioning (HVAC) system, a thermostat is typically fixed on the building wall in a common area, fixed nearby HVAC equipment, or used as a remote control in a wireless configuration situation. However, for many homes and industrial environments, where fixed wires connect to the HVAC system, a wall-mounted solution is used but is not flexible and is inconvenient to use.

SUMMARY OF THE INVENTION

With one aspect, thermostat comprises a detachable dial control unit that may be positioned in an anchoring component. The detachable dial control unit may be removed while still allowing the user to change thermostatic settings of a heating, ventilation, and air conditioning (HVAC) system by rotating an outer ring indicative of thermostatic information and sending the information to a headless control unit/wall mounted unit via a wireless communication channel.

With another aspect, alignment and adhesion of a detachable dial control unit with the anchoring component is facilitated by a plurality of alignment magnets having a magnetic polarity pattern. Each of the alignment magnets correspond to a corresponding complementary magnet located at the mating anchoring component such as a wall plate, wireless recharging dock, or wall mounted unit.

With another aspect, a wireless charging dock or wall mounted unit comprises a wireless recharging circuit that recharges the detachable dial control unit via an activated electromagnetic induction path.

With another aspect, the detachable dial control unit comprises an activation magnet. The wireless charging dock or wall mounted unit has a Hall effect device that detects when the activation magnet is within a predetermined distance when activating the wireless recharging circuit.

With another aspect, a detachable dial control unit may be paired with a headless control unit/wall mounted unit. When paired, the detachable dial control unit and the headless control unit/wall mounted unit may interact with each other.

With another aspect, a detachable dial control unit comprises a micro suction pad covering the at least three alignment magnets. The micro suction pad provides for easy and stable attachment to any flat surface after detachment from the wall plate, wireless charging dock, anchoring component, or wall mounted unit.

With another aspect, a detachable dial control unit may interact with a paired headless control unit/wall mounted unit while the detachable dial control unit is being charged by a wireless recharging dock/wall mounted unit. Also, the wall mounted unit and detachable dial control unit may be paired and the detachable dial control unit charged.

BRIEF DESCRIPTION OF THE DRAWINGS

The present disclosure is illustrated by way of example and not limited in the accompanying figures in which like reference numerals indicate similar elements and in which.

DETAILED DESCRIPTION

According to traditional approaches, a thermostat are either fixed on the wall in a common area, fixed nearby heating equipment, or used as a remote control in a wireless configuration situation. With many homes and industrial settings, fixed wires connect the thermostat to a heating, ventilation, and air conditioning (HVAC) system. For example, with 24 volt configurations commonly used in the United States and Nordic regions, a wall-mounted solution is supported; however, this approach is not flexible and is inconvenient to a user.

Figure 1:
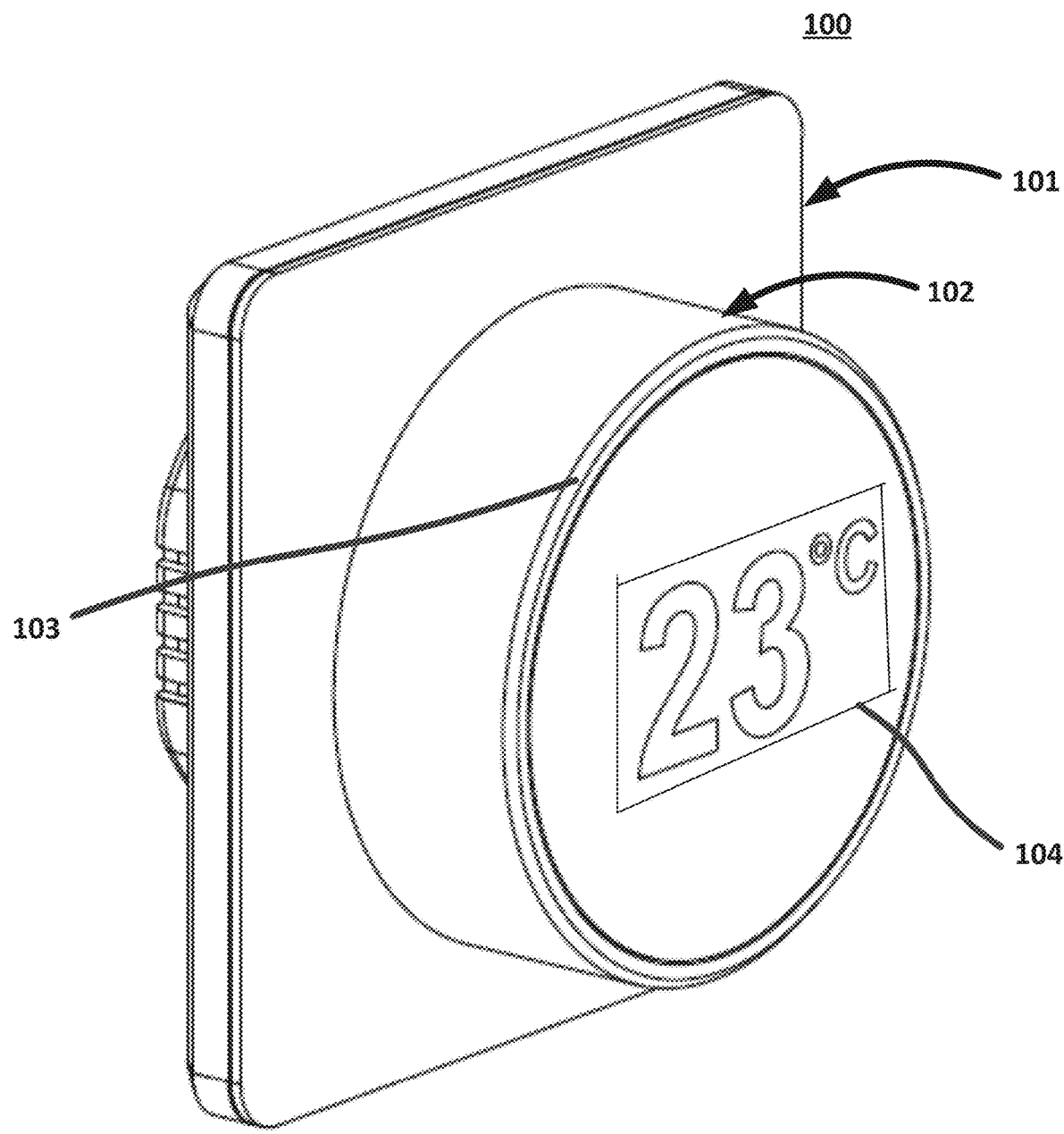
FIG. 1 shows a front view of a thermostat according to one or more aspects of the disclosure.

FIG. 1 shows a front view of thermostat 100 according to one or more aspects of the disclosure. Thermostat 100 comprises two functional portions: wall-mounted unit 101 and detachable dial control unit 102. Wall-mounted unit 101 (which may be referred to as an anchoring component or a headless control unit) operates as a terminal connector to the wall, allowing HVAC and power cables to be connected to thermostat 100. Detachable dial control unit 102 functions as a user interface and works in conjunction with wall-mounted unit 101 as a fully functional thermostat. With some embodiments, a wall mounted unit is equivalent to a wireless charging dock with a headless control unit.

Detachable dial control unit 102 may include display 104 providing an informational display and outer ring 103 that can be rotated, pressed, and/or touched by a user for entering data to thermostat 100, for example, setting temperature set points, selecting menu options, and other thermostatic information. Dial control unit may include a built-in temperature sensor (not explicitly shown) to measure the ambient temperature. Display 104, for example, may show temperature and/or other system information.

Detachable dial control unit 102 may comprise one or more micro suction pads at the bottom of it. When the dial control unit 102 is detached from wall module 101 and placed on a surface (for example, a table surface), a user can rotate, press, and/or touch dial control unit 102 and set the parameters since dial control unit 102 is held in a stationary manner to the surface.

Figure 2:
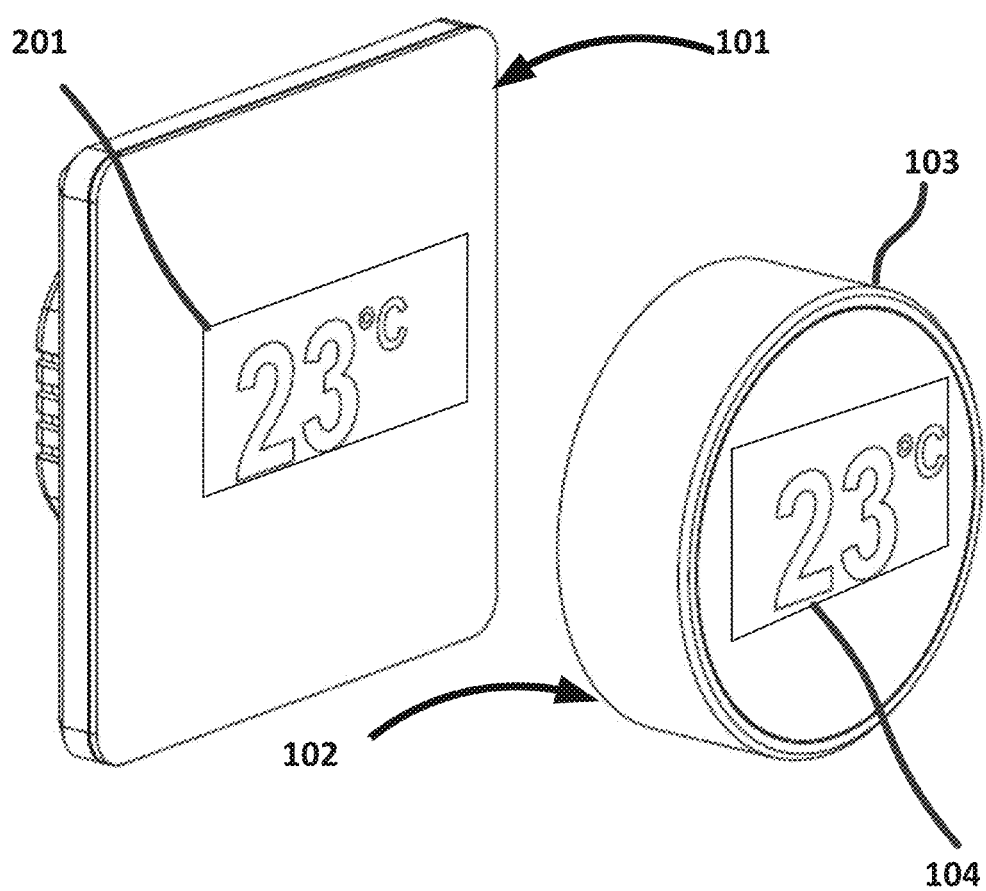
FIG. 2 shows a control unit detached from a wall mounted unit of the thermostat shown in FIG. 1 according to one or more aspects of the disclosure.

FIG. 2 shows control unit 102 when detached from wall unit 101 of thermostat 100 shown in FIGS. 1 and 2 according to one or more aspects of the disclosure. One aspect of the embodiments allows dial control unit 102 to be detached from wall mounted unit 101 while providing full HVAC functionality. Dial control unit 102 communicates with wall mounted unit 101 over wireless radio frequency (RF) communication (via a wireless transmitter and receiver not explicitly shown). A user may continue to operate thermostat 100 and view the status of the HVAC system using detached dial control unit 102 within the RF range of the communication channel.

With embodiments of the disclosure, operation of dial control unit 102 may be the same when dial control 102 is attached to or detached from wall mounted unit 101. For example, but is not limited to, mode setting and/or temperature setting may be confirmed by pressing down and/or touching on dial control unit 102. However, with some embodiments, settings may be initiated by a user touching an appropriate portion of dial control unit 102.

Wall mounted unit 101 may include a built-in temperature sensor (not explicitly shown) to measure the ambient temperature when dial control unit 102 is detached from wall mounted unit 101. Also, wall mounted unit 101 may include display 201 displaying temperature and/or other system information when dial control unit 102 is detached.

Wall mounted unit 101 may also include an occupancy sensor (not explicitly shown) so that thermostat 100 can automatically change its operation when one or more occupants are detected.

Figure 3:
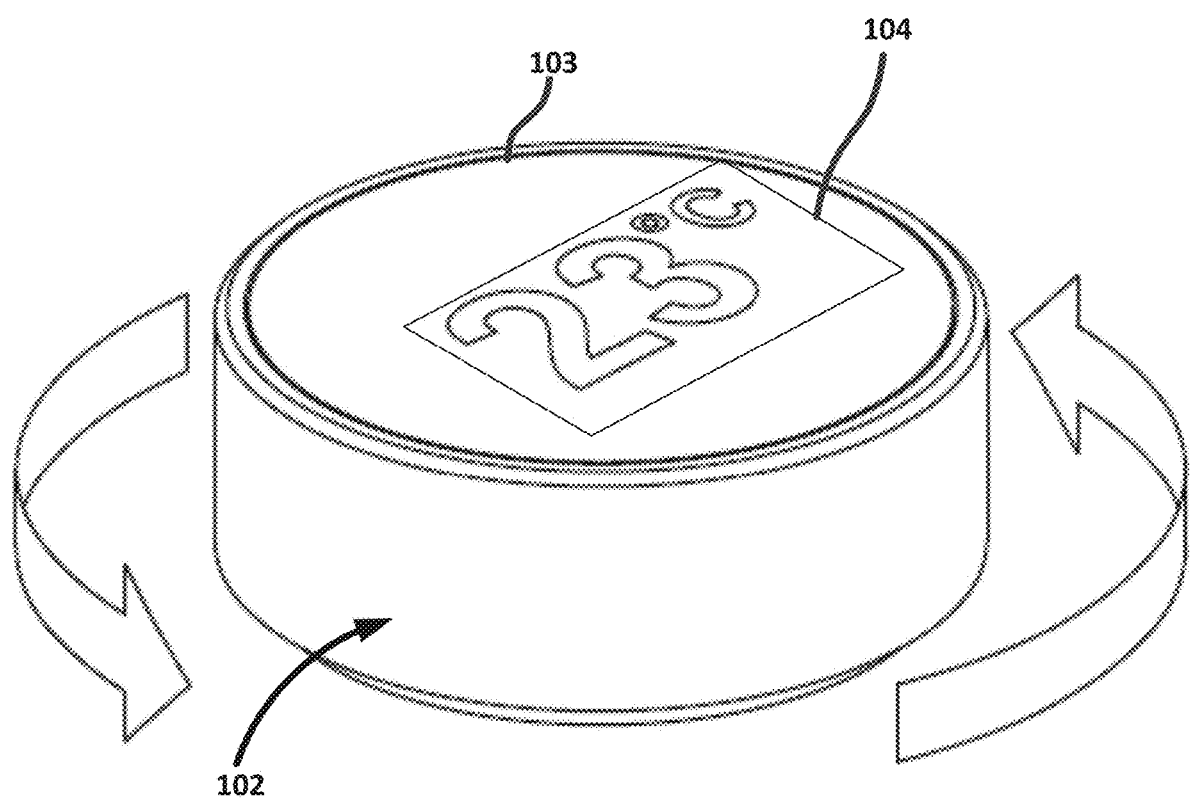
FIG. 3 shows a detachable control unit of thermostat shown in FIGS. 1 and 2 according to one or more aspects of the disclosure.

FIG. 3 shows detachable dial control unit 102 of thermostat shown in FIGS. 1 and 2. A user may detach thermostat unit 102 from wall mount unit 101, while continuing to interact with thermostat 100 to control an HVAC system.

Detachable dial control unit 102 may be attached to wall mount unit 101, but is not limited to, by a magnetic attraction of magnets so that a user can easily remove detachable dial control unit 102 from wall mount unit 101 by pulling on it. Because detachable dial control unit 102 electrically connects to wall mount unit 101 through a duplex wireless communication channel, no wires or connectors need to be detached when separating the units.

The user may enter thermostatic information (setting a function or a parameter of thermostat 100) into thermostat 100 by rotating ring 103 clockwise or counterclockwise, where the rotational position of ring 103 may be tracked. The user may press down or touch detachable dial control unit 102 to confirm the function or parameter setting and may view the thermostatic settings on display 104 entered via ring 103.

Figure 4:
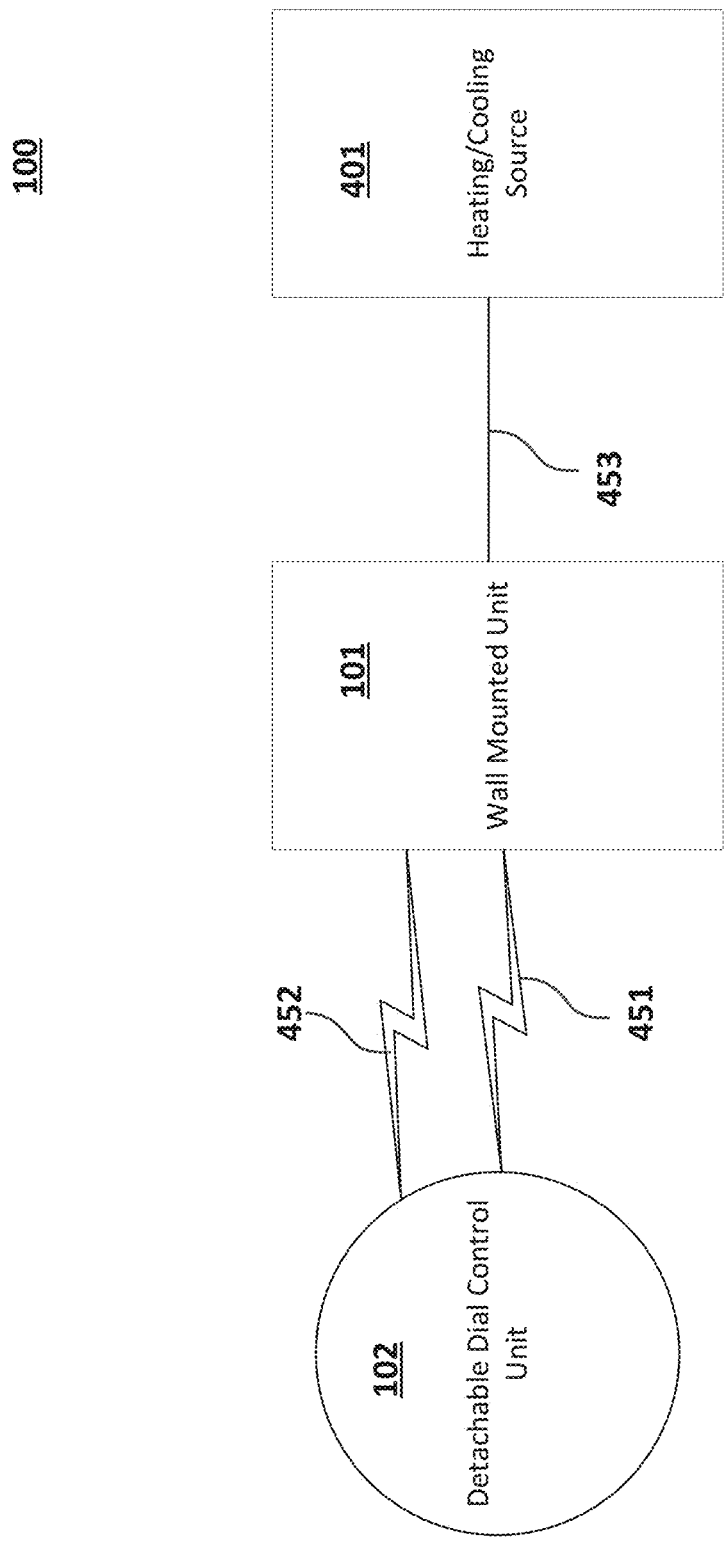
FIG. 4 shows a detachable control unit, a wall mounted unit, and a heating/cooling source according to one or more aspects of the disclosure.

FIG. 4 shows thermostat 100, which includes detachable dial control unit 102 communicating with wall mounted unit 101 via wireless channel 451. A user may use thermostat 100 when detachable dial control unit 102 is attached or detached from wall mounted unit 101 because control unit 102 communicates with wall mounted unit 102 via wireless channel 451, which may support duplex operation.

With an aspect of the disclosure, units 101 and 102 interact over wireless channel 451 when the units are attached or detached. However, the level of the signal over wireless channel 451 may to be reduced when units 101 and 102 are attached to avoid overloading (saturating) the associated wireless receiver/transmitter.

Based on thermostatic information provided by detachable dial control unit 102, wall mounted unit 101 generates and sends control signals to heating/cooling source 401 (for example, a furnace, air conditioner, or heat pump) over electrical path 453.

Detachable dial control unit 102 may also include a rechargeable battery (not explicitly shown). With some embodiments, the rechargeable battery may be recharged by wall mounted unit 101 (supporting a wireless battery charge function) via electromagnetic induction path 452.

With an aspect of the disclosure, sensor information (for example, measured temperature) and/or system information (for example, the status of heating/cooling source 401) may be sent back from wall unit 101 to detachable dial control unit 102 over wireless channel 451 (in other words, in the reverse direction as feedback).

Exemplary Clauses

1. A thermostat for controlling a heating, ventilation, and air conditioning (HVAC) system, the thermostat comprising:
   a wall mounted unit configured to be mounted on a wall, the wall mounted unit including:
      at least one terminal connector configured to connect to the HVAC system; and
      a first wireless receiver;
   a detachable dial control unit that is capable of being detached from the wall mounted unit while enabling a user to enter thermostatic information through the detachable dial control unit, the detachable dial control unit including:
      a display;
      an outer ring that is able to rotate, wherein a rotational position is indicative of thermostatic information; and
      a first wireless transmitter configured to convey the thermostatic information to the wireless receiver via a wireless duplex communication channel.

2. The thermostat of clause 1, wherein the thermostatic information is sent through the first wireless transmitter of the detachable dial control unit to the first wireless receiver of the wall mounted unit.

3. The thermostat of clause 2, wherein the detachable dial control unit further comprises:
   a dial interface that is coupled to the outer ring and is configured to obtain position information from the outer ring, wherein the position information is indicative of a setting; and
   a first computing device configured to obtain the position information from the dial interface and configured to convert the position information to the rotational position, and configured to translate the rotational position to the thermostatic information.

4. The thermostat of clause 3, wherein the wall mounted unit comprises:
   a second computing device configured to obtain the thermostatic information from the first wireless receiver, configured to transform the thermostatic information to a thermostatic signal, and configured to present the thermostatic signal to the at least one terminal connector.

5. The thermostat of clause 1, wherein the wall mounted unit comprises a second wireless transmitter and the detachable dial control unit comprises a second wireless receiver and wherein the wall mounted unit sends sensor and/or status information to the detachable dial control unit from the second wireless transmitter to the second wireless receiver over the duplex communication channel.

6. The thermostat of clause 1, wherein the wall mounted unit comprises a wireless recharging circuit and the detachable dial control unit comprises a rechargeable battery and wherein the wireless recharging circuit is configured to recharge the rechargeable battery via an electromagnetic induction path.

Figure 5:
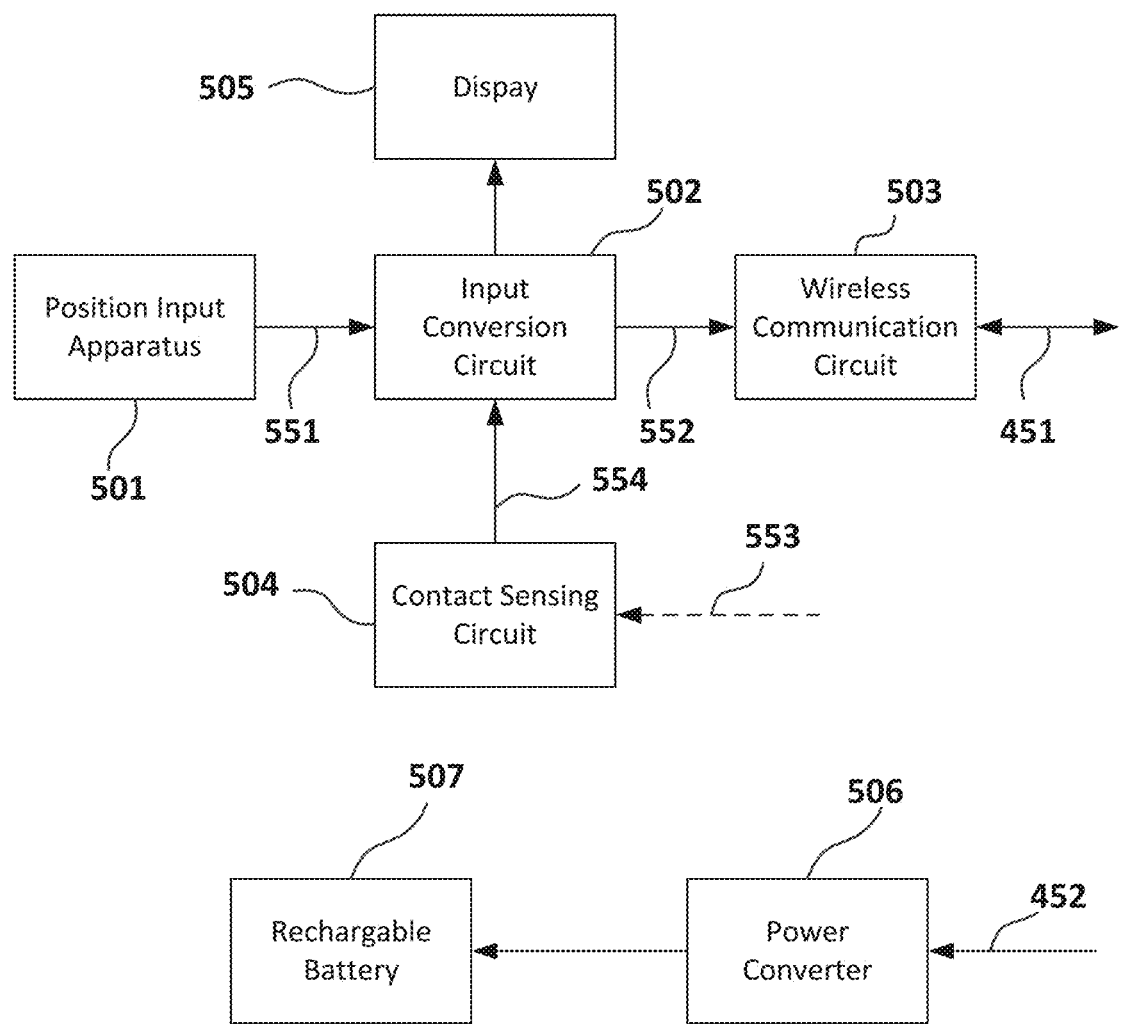
FIG. 5 shows an embodiment of a detachable control unit according to one or more aspects of the disclosure.

FIG. 5 shows an embodiment of detachable control unit 102 according to one or more aspects of the disclosure. A user can change thermostatic settings by manipulating position input apparatus 501. For example, the user may rotate outer ring 103 (as shown in FIG. 1). A dial interface (not explicitly shown) may be coupled to outer ring 103 and is configured to obtain position information 551 from outer ring 103, where position information 551 is indicative of a thermostatic setting.

Input conversion circuit 502 processes position information 551 by converting position information 551 to the rotational position and translating the rotational position to thermostatic information 552, which may be displayed to the user through display 505. With some embodiments, input conversion circuit 502 may comprise a system on a chip (SoC) with microcontroller unit (MCU) and Zigbee (wireless) modules.

When the user has rotated outer ring 103 to obtain a desired thermostatic setting, the user can enter the setting by pushing a front plate, lens, or outer ring 103. For example, the user may apply contact (pressure) 553 to contact sensing circuit 504 (for example, a switch/spring, a transducer such as a piezoelectric device, or capacitive touch screen). When the contact is sufficient, contact sensing circuit 504 generates signal 554 instructs input conversion circuit 502 to enter the thermostatic information and pass thermostatic information 552 to wireless communication circuit 503. Consequently, thermostatic information 552 is sent to wall mounted unit 101 over wireless channel 451.

Detachable dial control unit 102 may also be recharged by a magnetic field received through electromagnetic induction path 452. Power converter 506 converts energy of the magnetic field into electrical energy to recharge rechargeable battery 507.

Figure 6:
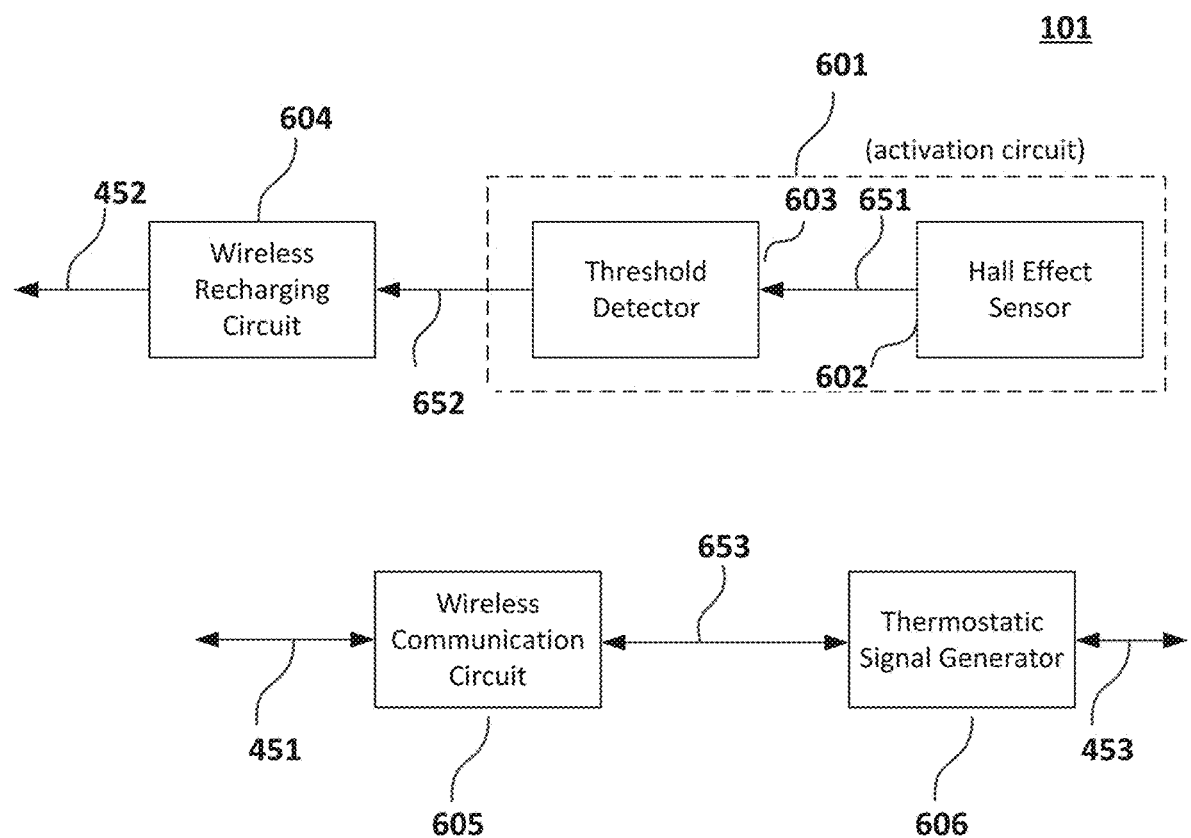
FIG. 6 shows an embodiment of a wall mounted unit according to one or more aspects of the disclosure.

FIG. 6 shows an embodiment of wall mounted unit 101 according to one or more aspects of the disclosure.

Wireless communication circuit 605 receives thermostatic information from detachable dial control unit 102 via communication channel 451. Thermostatic signal generator 606 transforms the thermostatic information to a thermostatic signal and to present the thermostatic signal to a HVAC system over electrical path 453 via one or more terminal connectors (not explicitly shown).

With some embodiments, wall mounted unit 101 supports the recharging of detachable dial control unit 102. For example, activation circuit 601 may activate wireless charging circuit 604 only when detachable dial control unit 102 is sufficiently close to wall mounted unit 101. This approach conserves energy utilization by generating a magnetic signal over electromagnetic induction path 452 only when the recharging can effectively occur.

Figure 9:
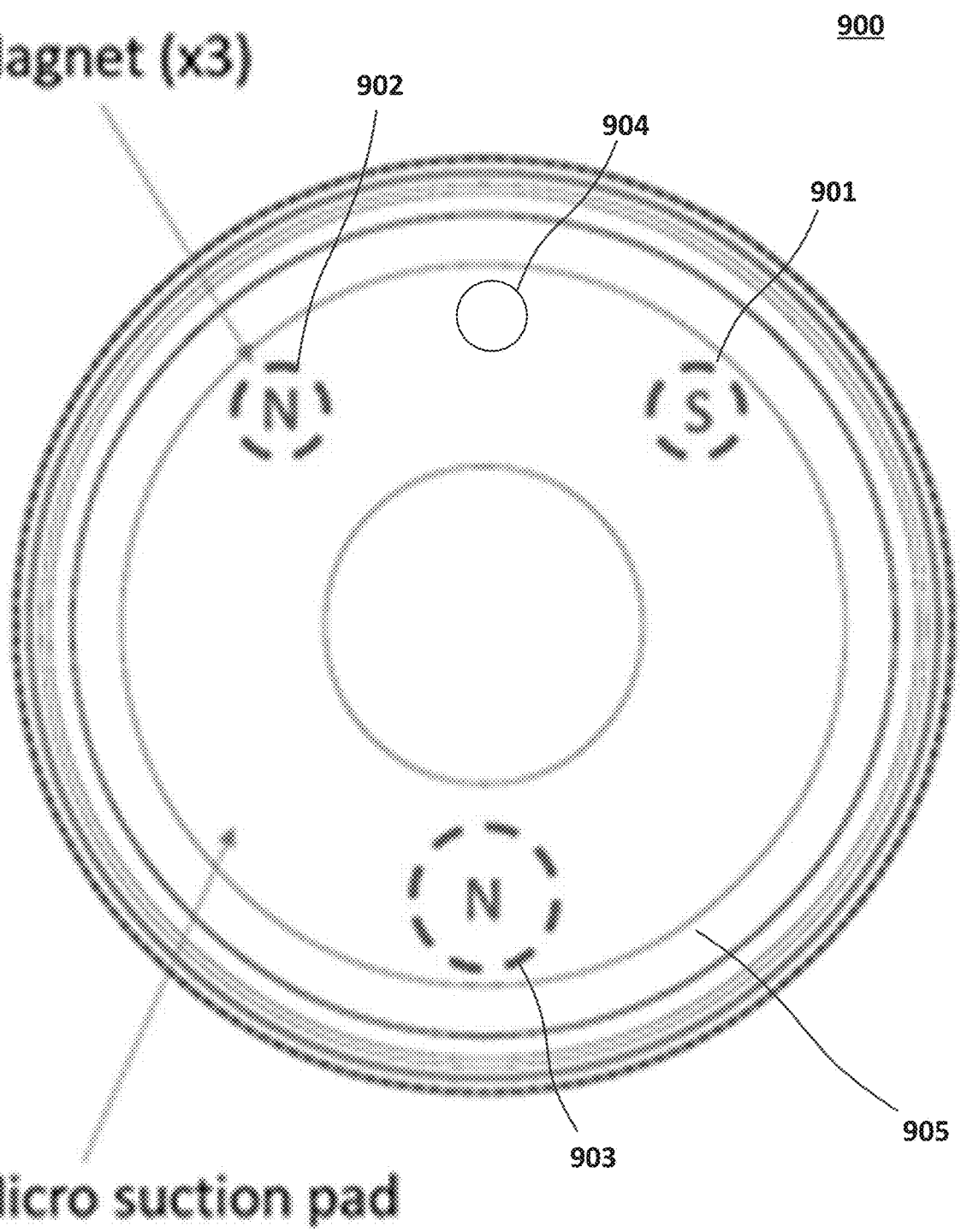
FIG. 9 shows a detachable dial control unit with alignment magnets and an activation magnet according to one or more aspects of the disclosure.

With the embodiment shown in FIG. 6, activation circuit 601 comprises Hall effect sensor 602 and threshold detector 603. Hall effect sensor 602 is typically a magnetic sensor that outputs electrical signal 651 proportional to the intensity of the magnetic field around it. As will be discussed, the magnetic field may e generated by an activation magnet (for example, magnet 904 as shown in FIG. 9). Generated signal 651 is then processed by threshold detector 603 to generate activation signal 652, which activates wireless recharging circuit 604) only when signal 651 is greater than a predetermined threshold. Consequently, wireless recharging circuit 604 is activated only when the activation magnet (and correspondingly detachable dial control unit 102) is within a predetermined distance from wall mounted unit 101. In other words, threshold detector 603 activates wireless recharging circuit 604 only when signal 651 exceeds a predetermined threshold and the predetermined threshold corresponds to a predetermined field strength of the electromagnetic induction path 452 at the predetermined distance.

With some embodiments, wall mounted unit 101 is associated (assigned) with a first unique code and detachable dial control unit 102 is associated (assigned) with a second unique code, where wall mounted unit 101 and detachable dial control unit 102 are uniquely paired by mapping the first unique code with the second unique code and where wall mounted unit 101 and the detachable dial control unit 102 interact with each other only when wall mounted unit 101 and detachable dial control unit 102 are paired.

With some embodiments, detachable dial control unit 102 may interact with wall mounted unit 101 over communication channel 451 even when detachable dial control unit 102 is being recharged (for example, when detachable dial control unit 102 is attached to wall mounted unit 101 as shown in FIG. 1).

Figure 7:
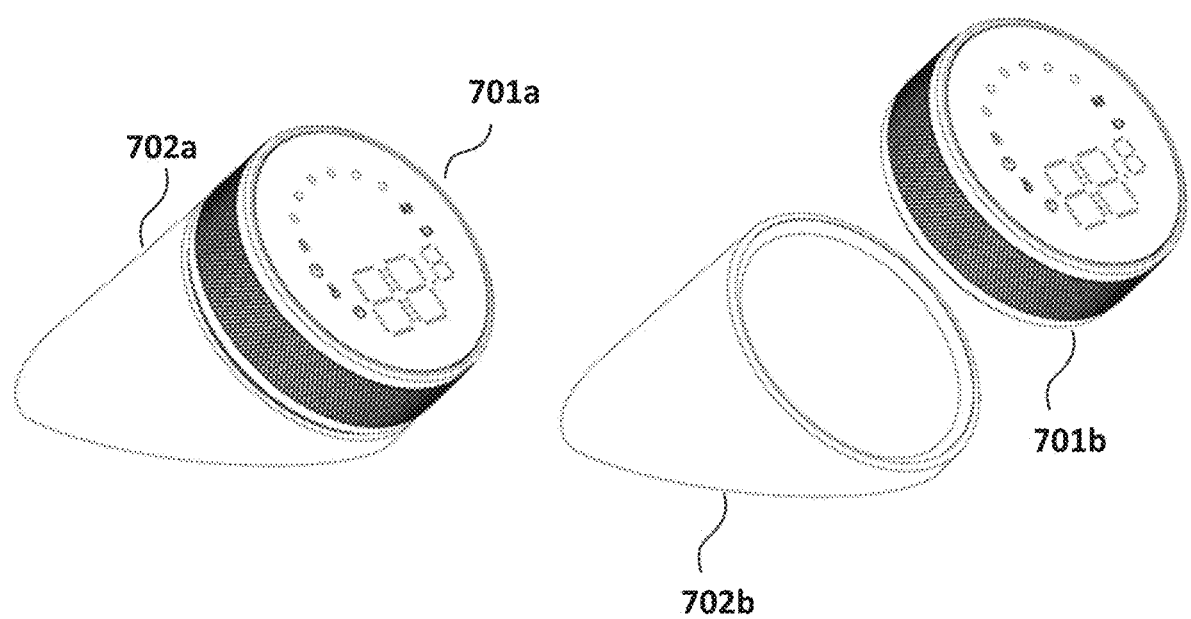
FIG. 7 shows a detachable dial control unit with wireless charging dock according to one or more aspects of the disclosure.

FIG. 7 shows detachable dial control unit 701a,b with wireless charging dock 702a,b according to one or more aspects of the disclosure. Detachable dial control unit 701a is attached to wireless charging dock 702a while detachable dial control unit 701b is removed (detached) from wireless charging dock 702b.

With some embodiments, wireless charging dock 702a,b supports the attachment of detachable dial control unit 701a,b and the recharging of detachable dial control unit 701a,b as previously discussed. However, wireless charging dock 702a,b typically does not have circuitry to interact with an HVAC system as does wall mounted unit 101 as shown in FIG. 4.

With some embodiments, detachable dial control unit 701a,b may be paired with wall mounted unit 101. Consequently, detachable dial control unit 701a,b may be recharged while interacting with paired wall mounted unit 101 as previously discussed. With some embodiments, a wireless charging dock with wall plate configuration may be paired with a headless control unit.

Figure 8:
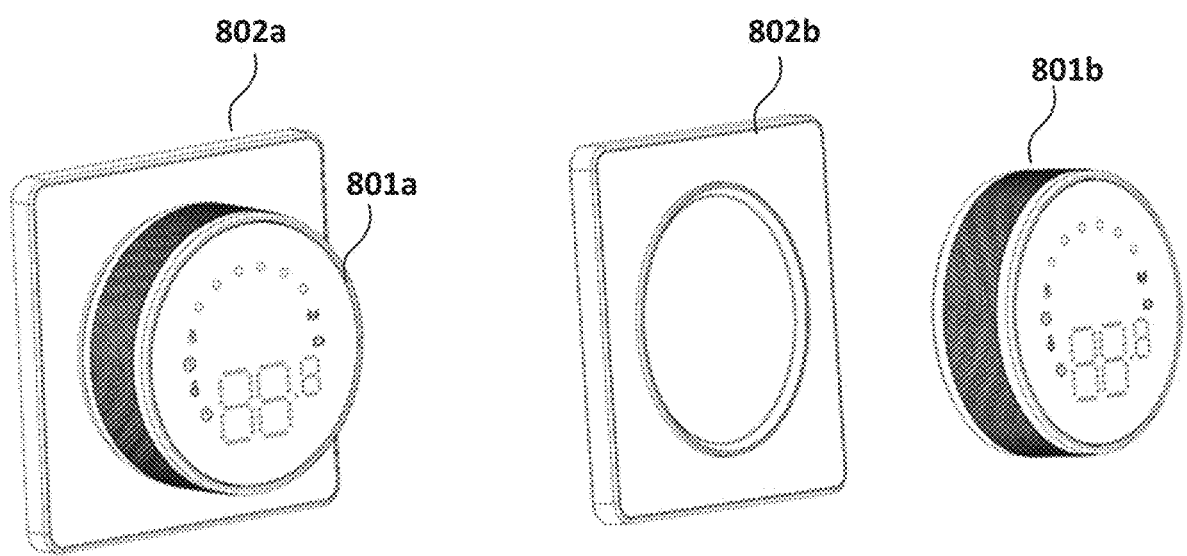
FIG. 8 shows a detachable dial control unit with a wall plate according to one or more aspects of the disclosure.

FIG. 8 shows detachable dial control unit 801a,b with wall plate 802a,b according to one or more aspects of the disclosure. While wall plate 802a,b can accommodate detachable dial control unit 801a,b (in other words, detachable dial control unit 801a,b can be mounted on a wall), wall plate 802a,b typically does not have circuitry to recharge detachable dial control unit 801a,b or to interact with an HVAC system.

With some embodiments, detachable dial control unit 801a,b may be paired with wall mounted unit 101. Consequently, detachable dial control unit 801a may be attached to wall plate 802a while interacting with paired wall mounted unit 101 as previously discussed. With some embodiments, a wireless charging dock with wall plate configuration may be paired with a headless control unit.

FIG. 9 shows detachable dial control unit 900 (bottom view) with alignment and adhesion magnets 901-903 and activation magnet 904 according to one or more aspects of the disclosure. While only three alignment magnets are shown, embodiments may accommodate different number of alignment magnets (for example, two or more than three alignment magnets as needed).

Alignment magnets 901-903 have different magnetic polarities corresponding to south pole, north pole, and north pole, respectively. The alignment magnets assist a user when positioning detachable dial control unit 900 to a corresponding anchoring component (wall plate, wireless recharging dock, or wall mounted unit). As will be discussed, the anchoring component comprises complementary magnets having opposite polarities to corresponding alignment magnets 901-903. Consequently, each alignment magnet/complementary magnet pair will be attracted when detachable dial control unit 900 is positioned only in the upright position.

Detachable dial control unit 900 also may include activation magnet 904 that generates a magnetic field, which is detected by a Hall effect sensor located in the anchoring component.

Detachable dial control unit 900 may also comprise micro suction pad 905 covering magnets 901-904 that assist detachable dial control unit 900 to adhere to the anchoring component such as wall mounted unit 101. Micro suction pad 905 comprises a material for sticking objects to surfaces. One side is typically attached to the base surface by a classical adhesive. Objects are attached to the other side by pressing them against micro suction pad 905.

Figure 10:
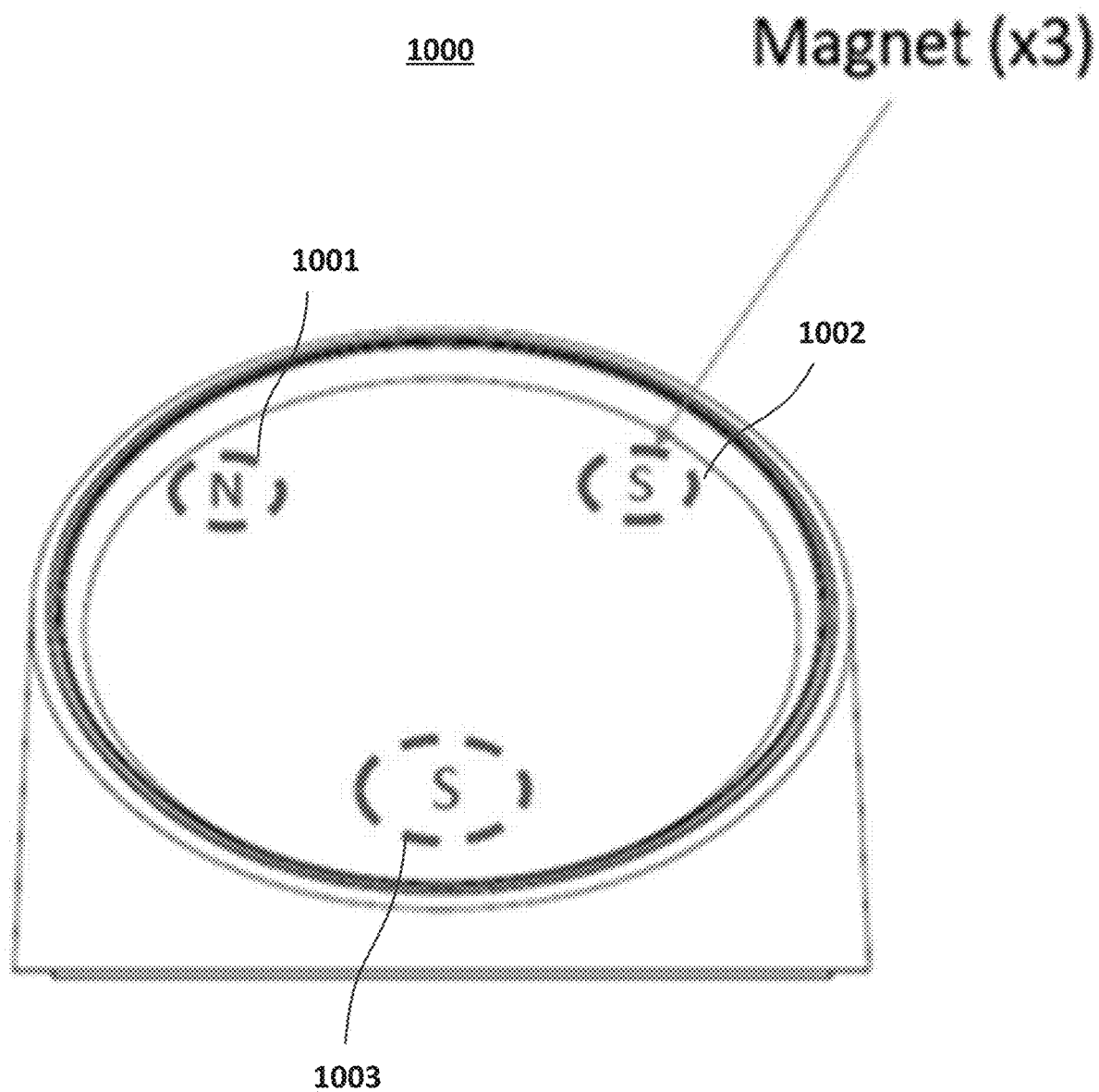
FIG. 10 shows a charging dock with complementary magnets so that a detachable dial control unit can be aligned in an upright position according to one or more aspects of the disclosure.

FIG. 10 shows charging dock 1000 with complementary magnets 1001-1003 so that detachable dial control unit 900 can be aligned in an upright position according to one or more aspects of the disclosure. Referring to FIG. 9, complementary magnets 1001-1003 correspond to alignment magnets 901-903 when detachable dial control unit 900 is positioned in the upright position. When detachable dial control unit 900 is not in the upright position, some of the alignment magnet/complementary magnet pairs will repeal rather than attract, enabling a user to detect misalignment.

Figure 11:
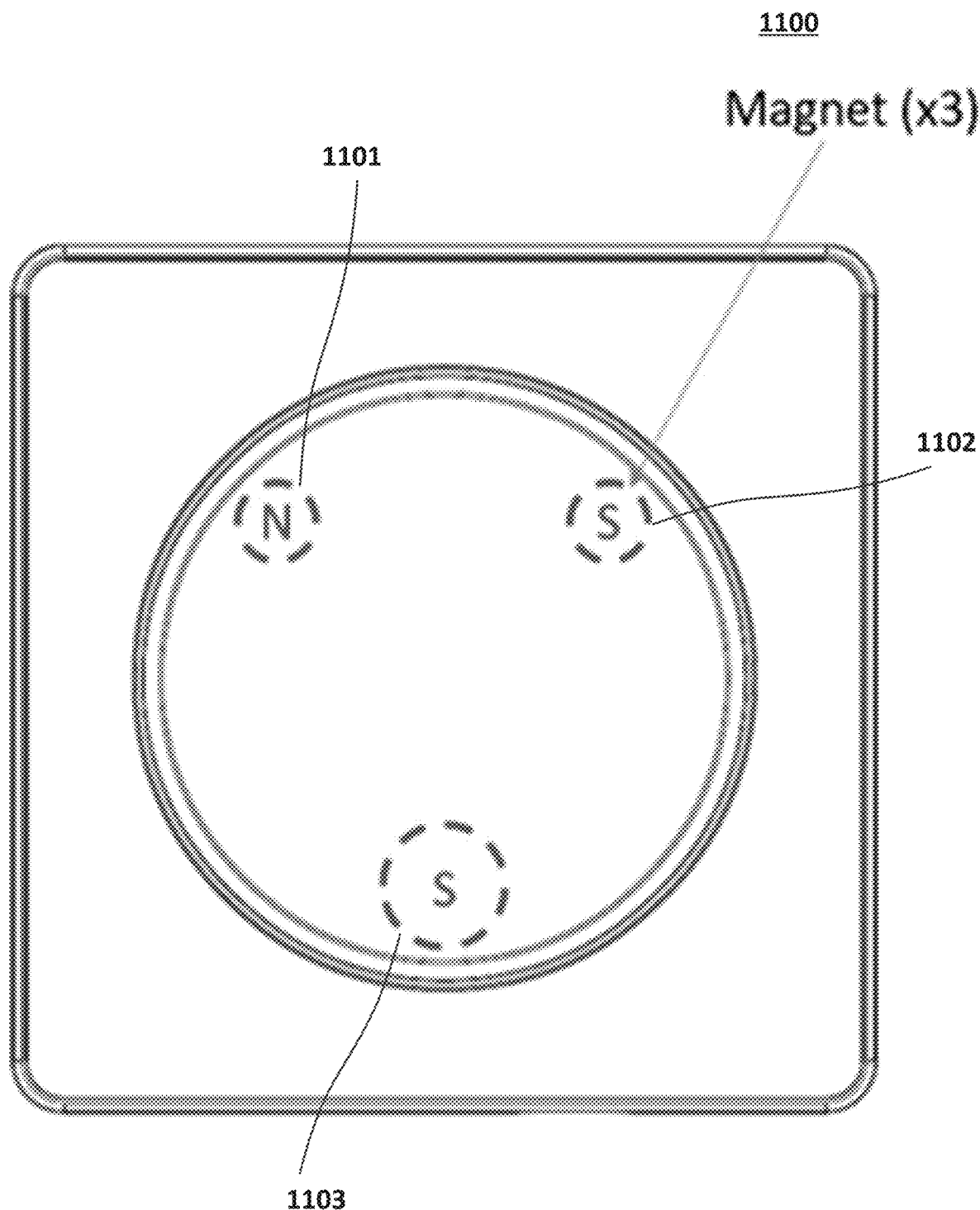
FIG. 11 shows a wall plate with complementary magnets so that a detachable dial control unit can be aligned in an upright position according to one or more aspects of the disclosure.

FIG. 11 shows wall plate 1100 with complementary magnets 1101-1103 so that detachable dial control unit 900 can be aligned in an upright position according to one or more aspects of the disclosure.

Referring to FIG. 9, complementary magnets 1101-1103 correspond to alignment magnets 901-903 when detachable dial control unit 900 is positioned in the upright position. When detachable dial control unit 900 is not in the upright position, some of the alignment magnet/complementary magnet pairs will repeal rather than attract, enabling a user to detect misalignment.

With some embodiments, wall mounted unit 101 may also comprise alignment magnets that operate in the same manner as discussed above.

With some embodiments, two configurations may be supported. A first configuration comprises a detachable dial control unit and a wall mounted unit. A second configuration comprises a detachable dial unit, a charging dock, wall plate, and a headless control unit. With the second configuration, the detachable dial unit may continue to interact with the headless control unit while being recharged by the charging dock. With some embodiments, a wireless charging dock/headless control unit/wall plate may be configured, where the headless control unit supports communication and the wireless charging dock supports recharging.

Aspects of the invention have been described in terms of illustrative embodiments thereof. Numerous other embodiments, modifications and variations within the scope and spirit of the disclosed invention will occur to persons of ordinary skill in the art from a review of this entire disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A thermostat for controlling a heating, ventilation, and air conditioning (HVAC) system, the thermostat comprising:
    a wall mounted unit configured to be mounted on a wall, the wall mounted unit comprising:
        at least one terminal connector configured to connect to the HVAC system;
        a first wireless receiver;
        a wireless recharging circuit configured to recharge a rechargeable battery via an electromagnetic induction path;
        a Hall effect sensor configured to output a signal configured to initiate an activation of the wireless recharging circuit; and
    a detachable dial control unit that is capable of being detached from the wall mounted unit while enabling a user to enter thermostatic information through the detachable dial control unit, the detachable dial control unit comprising:
        a display;
        a contact sensing circuit;
        the rechargeable battery configured to be rechargeable via the electromagnetic induction path;
        an activation magnet configured to cause, based on being within a predetermined distance from the Hall effect sensor, the Hall effect sensor to output the signal configured to initiate the activation of the wireless recharging circuit;
        an outer ring that is able to rotate, wherein a rotational position is indicative of thermostatic information;
        a portion of the detachable dial control unit, wherein the thermostatic information is entered by the thermostat when the contact sensing circuit detects at least a predetermined degree of contact against the portion; and
        a first wireless transmitter configured to convey the thermostatic information to the first wireless receiver via a wireless duplex communication channel.

2. The thermostat of claim 1, wherein the thermostatic information is sent through the first wireless transmitter of the detachable dial control unit to the first wireless receiver of the wall mounted unit.

3. The thermostat of claim 2, wherein the detachable dial control unit further comprises:
    a dial interface that is coupled to the outer ring and is configured to obtain position information from the outer ring, wherein the position information is indicative of a setting; and
    a first computing device configured to obtain the position information from the dial interface and configured to convert the position information to the rotational position, and configured to translate the rotational position to the thermostatic information.

4. The thermostat of claim 3, wherein the wall mounted unit comprises:

a second computing device configured to obtain the thermostatic information from the first wireless receiver, configured to transform the thermostatic information to a thermostatic signal, and configured to present the thermostatic signal to the at least one terminal connector.

5. The thermostat of claim 1, wherein the wall mounted unit comprises a second wireless transmitter and the detachable dial control unit comprises a second wireless receiver and wherein the wall mounted unit sends sensor and/or status information to the detachable dial control unit from the second wireless transmitter to the second wireless receiver over the wireless duplex communication channel.

6. The thermostat of claim 1, wherein the wall mounted unit further comprises a threshold detector, wherein the threshold detector obtains the signal from the Hall effect sensor, wherein the threshold detector activates the wireless recharging circuit only when the signal exceeds a predetermined threshold, and wherein the predetermined threshold corresponds to a predetermined field strength of the electromagnetic induction path at the predetermined distance.

7. The thermostat of claim 1, wherein the wall mounted unit is associated with a first unique code and the detachable dial control unit is associated with a second unique code, wherein the wall mounted unit and the detachable dial control unit are uniquely paired by mapping the first unique code with the second unique code, and wherein the wall mounted unit and the detachable dial control unit interact with each other only when the wall mounted unit and the detachable dial control unit are paired.

8. The thermostat of claim 1, wherein the portion of the detachable dial control unit comprises a transparent lens covering the display.

9. The thermostat of claim 8, wherein the portion of the detachable dial control unit further comprises the outer ring.

10. The thermostat of claim 1, wherein the detachable dial control unit comprises at least three alignment magnets and the wall mounted unit comprises at least three complementary magnets that have opposite magnetic polarities, and wherein each complementary magnet has an opposite magnetic polarity to a corresponding magnetic polarity of a corresponding alignment magnet.

11. The thermostat of claim 10, wherein the detachable dial control unit comprises a micro suction pad covering the at least three alignment magnets and wherein the micro suction pad is configured to adhere to a flat surface other than the wall mounted unit.

12. The thermostat of claim 10, wherein the at least three alignment magnets are characterized by a pattern of magnetic polarities in order to detect a misalignment of the detachable dial control unit to the wall mounted unit.

13. The thermostat of claim 1, wherein the wall mounted unit further comprises a second display configured to, based on the detachable dial control unit being detached from the wall mounted unit, display system information associated with the HVAC system.

14. The thermostat of claim 1, wherein the display is configured to display system information associated with the HVAC system; and wherein the wall mounted unit further comprises a second display configured to display at least a portion of the system information.

15. The thermostat of claim 1, wherein the wall mounted unit further comprises a temperature sensor configured to, based on the detachable dial control unit being detached from the wall mounted unit, sense an ambient temperature.

16. A detachable dial control unit of a thermostat, the detachable dial control unit comprising:

a contact sensing circuit;
an outer ring that is able to rotate, wherein a rotational position is indicative of thermostatic information;
a dial interface that is coupled to the outer ring and is configured to obtain position information from the outer ring, wherein the position information is indicative of a thermostatic setting;
a portion of the detachable dial control unit, wherein the position information is entered when the contact sensing circuit detects at least a predetermined degree of contact against the portion;
a computing device configured to obtain the position information from the dial interface when the position information is entered and configured to convert the position information to the rotational position, and configured to translate the rotational position to thermostatic information;
a wireless transmitter configured to convey the thermostatic information to a wall mounted unit via a wireless communication channel, wherein a wireless receiver is located at the wall mounted unit and wherein the thermostatic information is sent through the wireless transmitter of the detachable dial control unit to the wireless receiver at the wall mounted unit;
an activation magnet; and
a rechargeable battery configured to be recharged via an electromagnetic induction path generated by the wall mounted unit based on an activation signal sent based on the activation magnet being within a predetermined distance from the wall mounted unit . . .

17. The detachable dial control unit of claim 16 comprising:
at least three alignment magnets, wherein each alignment magnet corresponds to a corresponding complementary magnet located at the wall mounted unit.

18. The detachable dial control unit of claim 17, wherein the at least three alignment magnets is characterized by a pattern of magnetic polarities in order to detect a misalignment of the detachable dial control unit to the wall mounted unit.

19. The detachable dial control unit of claim 17 comprising:
a micro suction pad covering the at least three alignment magnets and wherein the micro suction pad is configured to adhere to a flat surface other than the wall mounted unit.

20. A thermostat for controlling a heating, ventilation, and air conditioning (HVAC) system, the thermostat comprising:
a wall mounted unit configured to be mounted on a wall, the wall mounted unit comprising:
at least one terminal connector configured to connect to the HVAC system;
at least three complementary magnets; and
a first wireless receiver; and
a detachable dial control unit that is capable of being detached from the wall mounted unit while enabling a user to enter thermostatic information through the detachable dial control unit, the detachable dial control unit comprising:
a display;
a contact sensing circuit;
at least three alignment magnets configured to adhere to the at least three complementary magnets of the wall mounted unit;

a micro suction pad covering the at least three alignment magnets, wherein the micro suction pad is configured to adhere to a flat surface other than the wall mounted unit;

an outer ring that is able to rotate, wherein a rotational position is indicative of thermostatic information;

a portion of the detachable dial control unit, wherein the thermostatic information is entered by the thermostat when the contact sensing circuit detects at least a predetermined degree of contact against the portion; and a first wireless transmitter configured to convey the thermostatic information to the first wireless receiver via a wireless duplex communication channel.

21. The thermostat of claim 20, wherein the wall mounted unit comprises a wireless recharging circuit and the detachable dial control unit comprises a rechargeable battery and wherein the wireless recharging circuit is configured to recharge the rechargeable battery via an electromagnetic induction path.

22. The thermostat of claim 20, wherein the detachable dial control unit comprises an activation magnet and the wall mounted unit comprises a Hall effect sensor and wherein an output signal from the Hall effect sensor initiates an activation of the wireless recharging circuit when the activation magnet within a predetermined distance from the Hall effect sensor.

23. The thermostat of claim 20 wherein the micro suction pad is configured to allow the at least three alignment magnets are configured to adhere to the wall mounted unit through the micro suction pad.

* * * * *